United States Patent [19]

Forgione

[11] 3,867,258
[45] Feb. 18, 1975

[54] LACTATE DEHYDROGENASE TEST MATERIAL

[75] Inventor: Peter Salvatore Forgione, Stamford, Conn.

[73] Assignee: American Cyanamid Company, Stamford, Conn.

[22] Filed: Nov. 8, 1973

[21] Appl. No.: 414,034

[52] U.S. Cl. .......................... 195/99, 195/103.5 R
[51] Int. Cl. ..................... G01n 31/14, G01n 33/16
[58] Field of Search ......... 195/103.5 R, DIG. 11, 99

[56] References Cited
UNITED STATES PATENTS

| | | | |
|---|---|---|---|
| 2,999,052 | 9/1961 | Albaum et al. | 195/103.5 R |
| 3,753,861 | 8/1973 | Forgione et al. | 195/DIG. 11 |

*Primary Examiner*—Alvin E. Tanenholtz
*Attorney, Agent, or Firm*—Frank M. Van Riet

[57] ABSTRACT

Diagnostic test indicators for the determination of the concentration of lactate dehydrogenase in sera comprising a bibulous material having diaphorase covalently bound to a hydrophilic, cross-linked, sulfited aldehyde or ketone polymer dispersed throughout the interstices thereof which contains therein the dried residue resulting from the impregnation thereof with 1. an alkali lactate salt,
2. nicotinamide-adenine-dinucleotide and
3. a tetrazolium salt and a process for the production thereof, are disclosed.

14 Claims, No Drawings

3,867,258

LACTATE DEHYDROGENASE TEST MATERIAL

BACKGROUND OF THE INVENTION

The use of diagnostic tests in the clinical testing of patients has become increasingly common in recent years. Many of these tests employ the use of test papers wherein the person conducting the test merely contacts a reactive paper strip with a suspect material, usually a body fluid, and observes the color change or color intensity thereof in order to determine whether or not a particular effect is achieved. Test strips or cards of this type have been devised for glucose determination and treponemal diseases, for example.

Available tests for the detection of the concentration of lactate dehydrogenase in body fluids have, until now, consisted of extremely complex liquid systems whereby test tubes, measuring devices, ultraviolet light, standardization of instruments, correction factors depending upon temperature and false readings prevail. There has therefore existed, for a substantial period of time, the need for a simple testing mechanism for the determination of the concentration of serum lactate dehydrogenase in body fluids, especially the blood, which long-felt need is satisfied by the instant invention more fully discussed hereinbelow. See U.S. Pat. No. 3,663,374 & Br. Pat. No. 1,318,568.

SUMMARY

As mentioned briefly above, I have now discovered a novel test means for the determination of the concentration of lactate dehydrogenase in body fluids. My test means is useful for the qualitative detection and quantitative determination of lactate dehydrogenase in sera wherein the test means comprises a reagent composition incorporated within a bibulous carrier.

The quantitative determination of lactate dehydrogenase is extremely important in the detection of heart diseases, especially heart attacks in that, following heart attacks, the concentration of lactate dehydrogenase in the blood rises noticeably over its normal concentration. The early detection of such an abnormal rise in lactate dehydrogenase concentration can therefore obviously lead to a more accurate and rapid diagnosis of heart maladies.

Because early diagnosis of abnormal heart conditions is so important, a test for the detection of variables in the concentration of lactate dehydrogenase in the blood must be rapid and simple enough for the clinician to carry out but accurate enough to enable the diagnosis to be made without extreme chances of error or false readings. Such a mechanism is represented by the novel test indicators of the present invention. Utilizing my novel system, no instrumentation is necessary and no mixing or reconstitution of reagents is needed. Testing can therefore be conducted at home or in a doctor's office without any special equipment.

DESCRIPTION OF THE INVENTION INCLUDING PREFERRED EMBODIMENTS

The novel diagnostic test indicators for the determination of the concentration of lactate dehydrogenase, hereinafter sometimes referred as LDH, in sera comprise a bibulous material which contains therein convalently bound diaphorase and the dried residue resulting from the impregnation thereof with a series of reagent materials.

The bibulous material used in preparing the novel test indicators of the present invention preferably comprises a cellulosic sheet, although other bibulous materials can be used, having dispersed throughout the interstices thereof a hydrophilic, cross-linked, sulfited aldehyde or ketone polymer having diaphorase covalently bound thereto. This bibulous material per se forms no part of the instant invention and is merely a component of the overall unique test indicators claimed herein. The sulfited aldehyde or ketone polymer can be produced by sulfiting and cross-linking any such polymer to render it hydrophilic. By "hydrophilic" is meant that the resultant polymer is swellable in or capable of taking up water but is not substantially soluble therein. No criticality exists in the order of sulfiting and cross-linking the polymer but binding diaphorase thereto should always be accomplished last. Sulfiting can be effected by treating the polymer e.g. polyacrolein, with a suitable sulfite or material which imparts a sulfite group onto the polymer chain such as a sulfite per se, a hydrosulfite, a bisulfite, sulfurous acid and the like. Specifically, alkali metal or alkaline earth metal compounds and other salts such as sodium, potassium, calcium, ammonium etc. sulfites, bisulfites, hydrosulfites etc. can be used. The reaction is generally run at 25°–90°C. and under atmospheric pressure, a more precise method being disclosed in U.S. Pat. Nos. 2,657,192 and 3,271,334, which patents are hereby incorporated herein by reference. By the term "sulfited", as used herein, is meant that the polymer has been contacted with a material so as to modify it and should not be construed to necessarily mean that any added sulfite groups per se remain on the polymer after diaphorase binding, although such may be the case. See U.S. Pat. No. 3,753,861, incorporated herein by reference.

After the sulfite treatment, the sulfited aldehyde or ketone polymer is immobilized e.g. insolubilized such as by chemical cross-linking with a cross-linking agent or other immobilization agent useful for this purpose. For example, the procedures of U.S. Pat. No. 3,459,710, incorporated herein by reference, can be followed. Utilizing this method, sulfited polymer is contacted with e.g. a diamine such as ethylene diamine, tetramethylene diamine, N-methylethylene diamine, 1,6-hexamethylene diamine etc. at 0°–150°C. in a solvent.

The diaphorase is covalently bound to the resultant cross-linked, sulfited polymer at a temperature below that at which it, the enzyme, is deactivated. Generally, temperatures below about 50°C., preferably from about 5°–25°C. should be used. The binding is conducted in the presence of buffers (pH 7.0–7.5) and with agitation. The binding should be conducted in the presence of water since organic solvents tend to inactivate the diaphorase.

Typically, the bound diaphorase material is dispersed throughout the interstices of the bibulous material e.g. the cellulosic web in amounts ranging from about 5.0 to about 50.0%, by weight, based on the weight of the web.

The bibulous material used to form the novel test indicators of the present invention may be produced from any fiber-forming cellulosic material. The bibulous element is preferably cellulosic paper which may be made from all types of fiber stocks, including those of poor quality, such as oak, poplar, yellow birch and those of extremely short fiber length, as well as those of long fiber length and of good quality derivation, such as spruce and hemlock. A wide variety of fibrous cellulosic material used in the preparation of paper and the like may be used such as kraft pulp, rag pulp, ground wood, sulfite pulp, alpha pulp and the like. Similarly, other forms of paper-forming fibrous cellulose such as cotton linters, linen, and the like may be employed. These materials may be used alone or in admixture with fibers from other sources such as jute, hemp, sisal, strings, chopped canvas and other materials.

The cellulosic paper may also be obtained from bleached or unbleached kraft, bleached or unbleached sulfite or bleached or unbleached semi-chemical pulps. In addition, the paper may be made from mixtures of cellulosic paper-forming pulps with up to 10% of such other fibers and the like. Filaments of cellulosic materials such as cellulose acetate, regenerated cellulose and the like may also be used.

For most purposes it is preferred that the starting cellulosic fibers be unsized and generally free of added resins. However, for some purposes, it may be desirable to employ as the bibulous material, a porous, high wet strength paper such as may be obtained by incorporating into the paper from about 0.5 to 5.0%, by weight, based on the weight of the fibers, of a thermosetting aminoplast resin such as a urea-formaldehyde resin, a melamine-formaldehyde resin and the like. Such wet strength cellulosic papers are obtained in the conventional way by the use of such a resin applied to the pulp suspensions.

The method of making the cellulose paper useful in my invention is not critical and any known paper-making process may be employed, see, for instance, U.S. Pat. No. 3,551,205, hereby incorporated herein by reference. In the normal manufacture of paper, for example, cellulosic fibers, such as those derived from wood pulp, are beaten in water to disperse the fibers therein and to reduce them to a length and fineness suitable for paper making. During the beating operation the cellulosic fibers fibrillate to produce minute tendrils which serve to interlock the fibers together when they are deposited on the forming screen of the paper making machine from a slurry thereof to make a sheet therefrom as the suspending liquid is drawn through the screen.

The sulfited polymer bound diaphorase may be added to the cellulosic paper any time during the production thereof or even after the paper has been sheeted as long as the temperature employed does not deactivate the enzyme, as mentioned above. Therefore, it is within the scope of the present invention to prepare a beater pulp of paper making cellulosic fibers of any convenient consistency. To this can be added the sulfited polymer bound diaphorase. The suspension is then agitated gently to distribute the material uniformly therethrough and the aqueous suspension is then sheeted, preferably at a pH of between about 6.0 and 7.5 to form a wet, water-laid web containing the bound diaphorase. The web is then dried, preferably in air or under vacuum. Vacuum drying with a desicant of calcium chloride has proven effective. Drying at elevated temperatures is to be avoided since high temperatures tend to deactivate the diaphorase and render the dispersed material useless. In general, it is preferred that less than about 0.1% of residual water be retained in the final sheet.

By incorporating the bound diaphorase within the paper as it is being formed, there is obtained by direct engagement of fibers and bound enzyme, an integral mechanical union between the bound enzyme and the paper. Excellent porosity and permeability of the paper permit circulation of the buffer and the reagents to be impregnated into the web to produce the test indicators claimed herein. Within the paper, the fiber components enmesh to form an integral sheet structure which provides a holding and reinforcing matrix for the bound enzyme dispersed therethrough.

In paper-making mills where various pigments are added at the beater, the bound diaphorase may be added therewith or at any point more than about one minute from the wire. In mills where the pulp suspension is given heavy refining, the bound diaphorase may be added to the beater to the refiner effluent or to the screen effluent sufficiently ahead of the wire so that deposition becomes substantially complete before sheeting. Thus the application of the bound diaphorase may be easily adapted to most types of paper or mill conditions and may be added prior to sheet making or, less advantageously, may be applied to the sheet at a convenient point after sheet making, as discussed below.

Fibers which are very slightly soluble in the slurry medium may also be used. For example, since the paper is generally cast from a water slurry, the fibers may include some proportion of slightly soluble polyvinyl alcohol fibers. In the paper, as the medium is removed, these fibers tend to adhere at fiber junctions thereby providing additional strength to the ultimate article. Furthermore, to provide additional porosity in the web, one may employ a second fiber which is insoluble in the slurry medium but which is selectively soluble in another medium with which the web may be subsequently washed to remove the soluble fibers thereby leaving additional void space.

By employing the water-laying method, a cohesive paper sheet is obtained in most cases without need for any further binding material of the non-fibrous type. If a binder is found necessary, however, colloidal polytetrafluoroethylene aqueous emulsion may be added to the paper-making fibers and bound enzyme before the web is cast. Agitation of the slurry causes the colloidal suspension to be broken and the PTFE to be coagulated in the slurry. When the resultant slurry is cast, the PTFE extends throughout the web binding the bound diaphorase with the fibers. Other polymeric materials can also be used for this purpose.

The first reagent which is contacted with the bibulous material containing the diaphorase bound to the aldehyde or ketone polymer is an alkali lactate salt such as lithium lactate, sodium lactate, potassium lactate and the like. The lactate salt is used in amounts ranging from about 0.03 part to about 1.5 parts, preferably from about 0.02 part to about 0.09 part, by weight, based on 100 parts of aqueous solution.

Secondly, nicotinamide-adenine-dinucleotide, sometimes hereinafter referred to as NAD, is a critical reagent in my novel test indicators. This material is well known in the art and should be employed in concentrations ranging from about 0.01 part to about 0.20 part, preferably from about 0.015 part to about 0.08 part, by weight, based on 100 parts of aqueous solution. This material functions as the oxidant which upon reduction to NADH converts the tetrazolium salt to the colored formazan dye.

The third reagent used to produce my test indicators is a tetrazolium salt. This electron carrier component imparts to the area of the test indicator which is ultimately contacted with serum, a color (formazan dye) of such varying intensity as to be indicative of the concentration of the lactate dehydrogenase (LDH) in the test serum. These dyes are also well known and generally have the formula

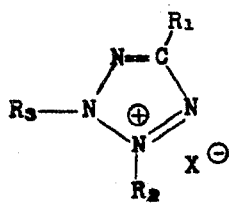

wherein $R_1$, $R_2$ and $R_3$ are the same or different aryl or substituted aryl radicals and X is an anion such as a halide etc.

Examples of useful salts include 2-(p-iodophenyl)-3-(p-nitrophenyl)-5-phenyl 2H-tetrazolium chloride (INT); nitro blue tetrazolium; Blue tetrazolium; 2,3,5-triphenyl-2H-tetrazolium chloride and the like.

These salts are incorporated into the indicator in concentrations ranging from about 0.05 part to about 0.35 part, preferably from about 0.1 part to about 0.2 part, by weight, based on 100 parts of aqueous solution used.

The mechanism by which the instant test indicators function is not completely understood however, although not wishing to be bound by any particular theory, it is believed that the reaction occurs thusly:

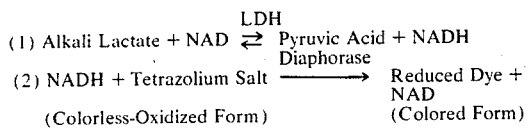

It can be seen therefore, that once the serum is added to the test indicator, the lactate dehydrogenase therein causes a reaction which results in the reduction of the tetrazolium salt and the formation of a colored indicator, the intensity of which is directly proportional to the concentration of the LDH in the serum. The clinician then merely compares the color which results to a standard color chart to ascertain the LDH concentration of the serum being tested.

During the production of the test indicator, it may be desirable to add a stabilizer to it so that it may be stored and used at some future time. This may be accomplished by incorporating therein any well known anti-oxidant for the tetrazolium salt such as the alkylated phenols such as 2,6-ditertiary butyl-p-cresol; butylated hydroxy toluene, 4-t-butyl catechol, octadecyl-3,5-di-t-butyl-4-hydroxy hydrocinnamate; alkylidene bisphenols such as 2,2'-methylenebis (6-t-butyl-4-methyl phenol), 4,4'-butylidenebis (6-t-butyl-3-methyl phenol); thiobisphenols such as 4,4'-thiobis (6-t-butyl-3-methyl phenol), 2,2'-thiobis (6-t-butyl-4-methyl phenol); polyphenols such as tetrakis [methylene (3,5-di-t-butyl-4-hydroxyhydrocinnamate)] methane, 1,3,5-trimethyl-2,4,6-tris (3,5-di-t-butyl-4-hydroxybenzyl) benzene; esters such as ditridecyl thiodipropionate, distearylthiodipropionate, dilaurylthiodipropionate; amines such as diaryl or dialkyl substituted p-phenylene diamines, diphenylamine, N-phenyl-α-naphthylamine; organic phosphites such as dibutyl phosphite, didecyl phosphite, dioctyl phosphite, diphenyldecyl phosphite, ditetradecyl phosphite, phenyldidecyl phosphite, phenylneopentyl phosphite, tridecyl phosphite, trilauryl trithiophosphite, triphenyl phosphite, trisnonyl phosphite and various other well known anti-oxidants such as the quinones including hydroquinone, hydroquinone monomethyl ether, mono-t-butylhydroquinone, 2,5-di-t-butyl hydroquinone, toluhydroquinone, 2,5-di-t-amyl hydroquinone and the like. I may also use phenothiazine, hydroxybenzophenone, p-dimethylaminonitrobenzene, thiodipropionic acid etc. These materials are used in amounts ranging from about 0.01 part to 2.0 part, preferably from about 0.02 to 1.0 part, based on 100 parts of solution, and may be added as aqueous or organic solvent solutions.

The anti-oxidant prevents color build-up developing from the tetrazolium salt which premature color formation would obviously interfere with the later analysis may be the diagnostician.

Long term stabilizers may also be incorporated into the test indicators to maintain the enzymatic activity of the diaphorase. Carbohydrates such as maltose, sorbitol, jaugar gum as well as water-soluble polymeric ethylene oxides, of both high and low molecular weight and the like have been found useful for this purpose with concentrations thereof ranging from about 5.0 parts to about 25.0 parts by weight preferably 15.0 parts to 20.0 parts per 100 parts of aqueous solution, being satisfactory.

Materials such as poly(methacrylic acid), polyacrylic acid, carboxymethyl cellulose and copoly-maleic acid-methylvinyl ether and the like, i.e. generally any polyanionic material may be incorporated into the test indicators in order to prevent the chromatographic movement of the dye throughout the cellulosic carrier. These materials are used in amounts ranging from about 0.1 part to about 3.0 parts, preferably from about 0.5 part to about 2.5 parts, based on 100 parts of solution.

A suitable non-ionic wetting agent, any of those which are well-known to the skilled artisan also may be incorporated to cause uniform dispersion of the ingredients of the test indicator over the surface of the bibulous sheet. For instance, I may utilize the fatty alkanolamides i.e. the alkanolamine reaction products with fatty acids such as lauric acid or stripped coconut fatty acid, suitable alkanolamines being diethanolamine, monoethanolamine, monoisopropanolamine and the like; the ethylene oxide derived materials, i.e. those derived from the reaction of ethylene oxide with alkylphenols wherein the alkyl group is octyl, nonyl or higher, long chain fatty alcohols such as tridecyl alcohol, lanolin, lecithin alcohol etc., long chain fatty acids such as tall oil, oleic acid, abietic acid etc., long chain fatty mercaptans, long chain fatty amines, polyoxypropylene glycol, fatty sorbitan ester; sugar esters i.e. the alcoholysis reaction products of the methyl ester of a fatty acid and sucrose or raffinose; polysorbitol; polyvinyl alcohol; methyl cellulose; ethoxylated phenol/formaldehyde resins and the like. These materials may be added along with each component of the indicator, if applied singly, or in admixture therewith if applied as a whole, in amounts of 0.01 part to 1.0 part of wetting agent per 100 parts of solution used.

In producing the novel test indicators of the present invention, the method employed depends upon whether an anti-oxidant for the tetrazolium salt is used or not and whether the anti-oxidant is water-soluble or organic solvent soluble.

If no anti-oxidant is employed or if the anti-oxidant is water-soluble, a buffer solution of the alkali lactate, tetrazolium salt and NAD is prepared at a pH of about 8.8 and the buffer solution is then added to the carrier sheet containing the bound diaphorase. The so-impregnated material is then dried such as in a drying tunnel, a forced draft oven etc. and recovered. If any other ingredients except a solvent soluble anti-oxidant are to be added, they are merely incorporated into the buffer solution in their appropriate concentrations and added as such.

When an anti-oxidant which is only organic-solvent soluble is employed, an aqueous solution of the tetrazolium salt is prepared and the bibulous carrier is contacted therewith at pH 7.5–8.8. The carrier is then dried such as in a drying tunnel or forced draft oven. An organic solvent solution of the anti-oxidant is then prepared and the once impregnated carrier is impregnated therewith and again dried. A second buffer solution of the NAD and alkali lactate at a pH of 8.8 is then prepared and the twice impregnated carrier is again impregnated and dried, as above.

If a chromatographic effect preventor is employed, it is added along with the tetrazolium salt. Carbohydrate stabilizer for the diaphorase may be added individually before the tetrazolium salt or any time thereafter or in conjunction with any other component of the indicator system.

Wetting agents are preferably added with each impregnation but may be added with some or none of the components which are impregnated into the carrier.

The above concentrations expressed in connection with the components which may be incorporated into my novel indicators are set forth as to the solutions of these components which are saturated onto the bibulous carrier only and are not meant to specify the amount of each component which is eventually present on the bibulous carrier. That is to say, saturation of the bibulous carrier with a specific concentration of a specific component in solution will not unequivocally incorporate into the bibulous carrier the same amount or percentage of component present in the solution. I have found however, that the above concentrations of solution are generally sufficient so as to incorporate sufficient component into the bibulous material upon saturation therewith to produce a functional test indicator, the adsorptive capabilities of the bibulous material being characteristic of materials generally used for this purpose.

Although the above discussion with regard to the the preparation of my novel indicators teaches saturation of the bibulous material by dipping, it is sometimes necessary, especially wherein a series of saturations are to be conducted, to apply the component solution to the bibulous carrier rather than dipping the carrier because extended dippings may tend to wash out previously deposited components.

Examples of buffers which may be used include phosphate buffer, phthalate buffer, tris buffer, citrate-phosphate buffer, broate-succinate buffer etc. The preferred buffer is tris buffer i.e. 2-amino-2-(hydroxymethyl)-1,3-propanediol in 0.05 to 0.2M concentration.

The color change of the test indicators of the present invention is from colorless to deep reddish brown.

EXAMPLE A

Solubilization of Polyacrolein

To a suitable reaction vessel fitted with stirrer, condenser, thermometer, nitrogen gas inlet and constant temperature bath are added 344 parts of sodium metabisulfite and 2,400 ml. of distilled water. The pH of this solution is adjusted to 5.6 with 10M sodium hydroxide solution and 300 parts of finely divided polyacrolein are added. The reaction is allowed to continue under a nitrogen blanket at 65°C. until a clear, viscous, water-soluble polyacrolein adduct forms. The reaction is cooled and stored.

EXAMPLE B

Cross-linking of soluble Polyacrolein

To a suitable glass-lined reaction vessel equipped with stirrer and nitrogen gas inlet are added 2,500 ml. of the polyacrolein bisulfite adduct produced in Example A, above, in 4,000 ml. of distilled water. The solution is gently stirred and 300 parts of 1,6-hexamethylene diamine in 400 ml. of distilled water are added drop-wise over a 4 hour period. A yellow, cross-linked polymer becomes suspended and is heated to 60°C. under a heavy nitrogen blanket for 10 minutes and then cooled to room temperature. The polymer is filtered through cheese cloth, placed in a Buchner funnel and washed thoroughly with water. The cross-linked polymer is then slurried gently with ten times its volume of water for 15–20 minutes, allowed to stand 20 minutes and filtered. The washing procedure is repeated until the pH of the washings are between 6.5 and 7.0. The solid adduct is then slurried gently for 20 minutes with 1.0M disodium phosphate adjusted to pH 6.5 and washed with distilled water.

EXAMPLE C

Preparation of paper containing bound diaphorase

To a suitable reaction vessel is added 0.1 part of diaphorase and 80 ml. of phosphate buffer (0.1M; pH 7.2). The solution is allowed to stand in the refrigerator without agitation for 30 minutes. The enzyme is then completely dissolved by stirring. In a separate vessel are slurried 2.0 parts of the modified polyacrolein of Example B, above, with 50 ml. of the same phosphate buffer. After stirring 10 minutes, the pH is readjusted to 7.2 with 0.1N sodium hydroxide. The contents of both vessels are then admixed and allowed to stir gently overnight at 40°C. The enzyme adduct is then filtered and washed with copious amounts of deionized water. Consistent binding yields of 75–97% are achieved using this method.

A 50/50 Albacel/Astracel pulp (concentration 2.6 g./100 cc.) is washed with water and subsequently with methanol to remove any residual sulfite and is then dried. To 10.0 parts of the resultant pulp are added 2.0 parts of the wet enzyme adduct in a suitable blending vessel. The ingredients are blended for 5 minutes, ice being added to the mixture to prevent heat build-up. The blended slurry is then processed into a paper mat about the thickness of standard filter paper and of 6 inch diameter on a British Hand Sheet Mold. The paper is dried in vacuo over a desiccant for 16 hours. The resultant sheet is then recovered.

The following examples are set forth for purposes of illustration only and are not to be construed as limitations on the present invention except as set forth in the appended claims. All parts and percentages are by weight unless otherwise specified.

EXAMPLE 1

This paper of Example C, above, is saturated with 100 parts of an aqueous solution containing 0.7 part of polymethacrylic acid, 1.0 part of tris buffer i.e. 2-amino-2-(hydroxymethyl)-1,3 propanediol, 20.0 parts of d (+) maltose, 0.025 part of polyoxyethylene (20) cetyl ether, 0.08 part of nicotinamide-adenine dinucleotide (NAD), 0.16 part of [2-(p-iodophenyl)-3-(p-nitrophenyl)-5-phenyl-2H-tetrazolium chloride] (INT), 0.5 part of p-dimethylaminonitrosobenzene and 1.5 parts of a 60% solution of lithium lactate, all at pH 8.6. The wet paper is then dried under vacuum at room temperature in the dark. The resultant dry yellow paper on testing with a series of test sera gives a rust colored spot, the shade of color being proportional to the amount of LDH present in each individual test serum. The test paper is found to detect both normal and abnormal quantities of LDH in test sera.

EXAMPLE 2

The test paper from Example C, above, is dipped in a solution of 20.0 parts of maltose in 100 parts of water at pH 7.2 and dried. A second dipping is carried out with a solution containing 1.0 part of dilaurylthiodipropionate, and 0.03 part of polyoxylethylene 20 cetyl ether in 100 parts of hexane. The paper is again dried. The dried paper is then dipped in a third solution containing 0.2 part of the INT of Example 1, in 100 parts of water and 1.0 part of polymethacrylic acid at pH 7.5. Drying is again effected. The dried paper is then dipped in a solution containing an additional part of DLTDP and 0.03 part of the wetting agent in 100 parts of hexane and again dried. A final dipping is made in a solution composed of 0.09 part of NAD, 0.02 part of the same wetting agent and 0.86 part of lithium lactate in 100 parts of 0.1 molar tris buffer at pH 8.8. This active paper, on testing with test serum, gives a violet-red spot, the intensity of which compares to that of a standard serum containing a known quantity of LDH.

EXAMPLES 3-8

The procedure of Example 2 is again followed except that the various components and concentrations thereof are varied to the extent set forth in Table I, below. Each test indicator produced therein utilizes the same paper and NAD of Example 2 with bound diaphorase therein. The concentrations are set forth as per 100 parts of water or solvent. In each instance, the resultant test indicator functions effectively.

TABLE I

| Ex. | Binding Polymer | Anti-Oxidant | Tetrazonium Salt | Lactate | Enzyme Stabilizer | Chromatograph Preventor | Non-ionic Wetting Agent |
|---|---|---|---|---|---|---|---|
| 3 | Acrolein-Styrene (93.8/6.2) | — | Nitroblue Tetrazolium-0.15 | Same as Ex. 2 | — | — | — |
| 4 | Polymethyl-vinylketone | Phenothiazine 1.0 | do. | do. | — | — | — |
| 5 | Acrolein-vinyl acetate (60/40 | Dibutyl phosphite-2.0 | Blue tetrazolium-0.35 | do. | Sorbitol-25.0 | Carboxymethyl cellulose-2.0 | Ethylene oxide-tall oil reaction product-0.05 |
| 6 | Same as Ex. B | Hydroxybenzo phenone-0.01 | do. | Sodium lactate-0.05 | Diethylene glycol-15.0 | Polyacrylic acid-0.80 | Polysorbitol-0.75 |
| 7 | do. | N-phenyl-α-naphthyl-amine-1.5 | 2,3,5-triphenyl-2H tetrazolium chloride-0.08 | do. | Maltose-10.0 | Maleic acid-methylvinyl ether copolymer (75/25)-2.8 | Methyl cellulose-1.0 |
| 8 | do. | 2,6-di-t-butyl-p-cresol-0.80 | do. | Potassium lactate-0.1 | do.-20.0 | Same as Ex. 2 | Lauric acid-ethanolamine reaction product-1.0 |

I claim:

1. A diagnostic test indicator for the determination of the concentration of lactate dehydrogenase in sera comprising a bibulous material having diaphorase covalently bound to a hydrophilic, cross-linked, sulfited aldehyde or ketone polymer dispersed throughout the interstices thereof which contains therein the dried residue resulting from the impregnation thereof with
   1. an alkali lactate salt,
   2. nicotinamide-adenine-dinucleotide and
   3. a tetrazolium salt.

2. A diagnostic test indicator according to claim 1 wherein (1) is lithium lactate.

3. A diagnostic test indicator according to claim 1 wherein (3) is 2-(p-iodophenyl)-3-(p-nitrophenyl)-5-phenyl-2H tetrazolium chloride.

4. A diagnostic test indicator according to claim 1 wherein said bibulous material is paper.

5. A diagnostic test indicator according to claim 1 wherein said polymer is polyacrolein.

6. A diagnostic test indicator according to claim 1 wherein the bibulous material additionally contains (4) a stabilizer for said diaphorase.

7. A diagnostic test indicator according to claim 1 wherein the bibulous material additionally contains (5) an anti-oxidant.

8. A diagnostic test indicator according to claim 1 wherein the bibulous material additionally contains (6) a chromatographic effect preventor.

9. A diagnostic test indicator according to claim 1 wherein the bibulous material additionally contains (7) a nonionic wetting agent.

10. A process for the preparation of the diagnostic test indicator of claim 1 which comprises forming a sheet of cellulosic fibers and a hydrophilic, cross-linked, sulfited aldehyde or ketone polymer having diaphorase covalently bound thereto, impregnating the resultant sheet with an aqueous solution of (1), (2), and (3) and thereafter drying the thus impregnated sheet.

11. A process according to claim 10 wherein (4) is lithium lactate.

12. A process according to claim 10 wherein (3) is 2-(p-iodophenyl)-3-(p-nitrophenyl)-5-phenyl-2H-tetrazolium chloride.

13. A process according to claim 10 wherein said cellulosic fibers are paper-making fibers.

14. A process according to claim 10 wherein said polymer is polyacrolein.

* * * * *